Nov. 24, 1953 P. DOERSELN 2,659,962
TOOLHOLDER
Filed April 29, 1950
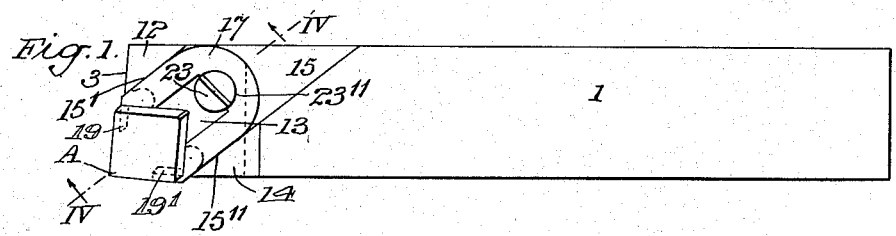
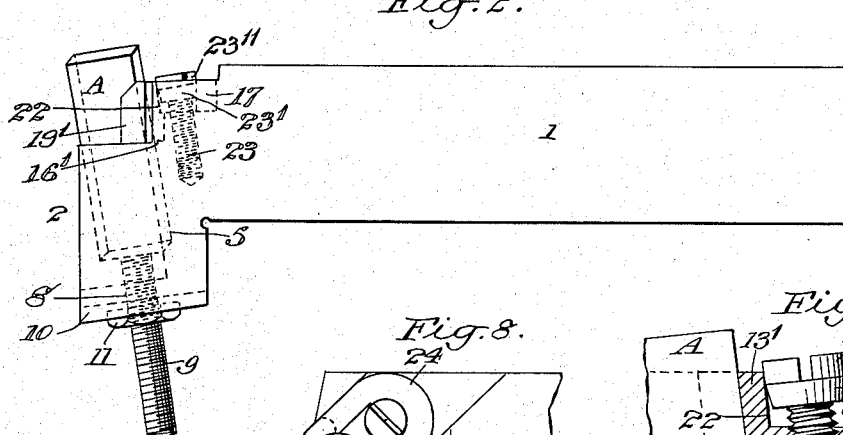
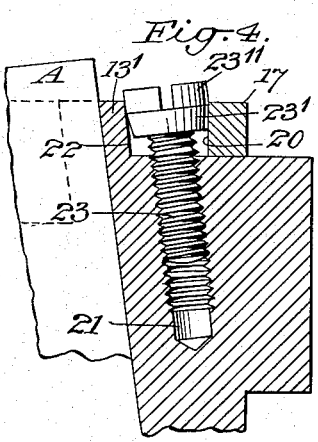
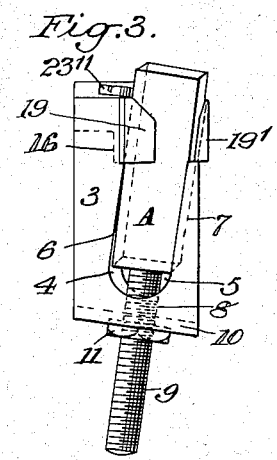
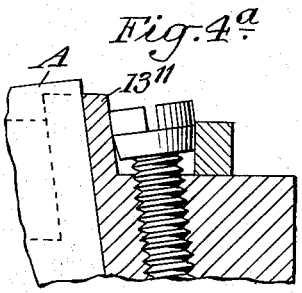
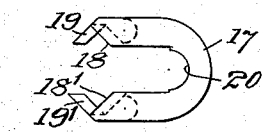
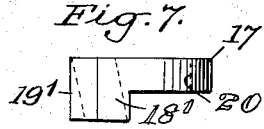
INVENTOR.
Paul Doerseln
BY Brown + Jenark
ATTORNEYS Patented Nov. 24, 1953

2,659,962

UNITED STATES PATENT OFFICE 2,659,962

TOOLHOLDER

Paul Doerseln, Fairlawn, N. J.

Application April 29, 1950, Serial No. 159,031

7 Claims. (Cl. 29—96)

This invention relates to a tool holder of the type designed to hold a super-hard (carbide or the like) insert in working position in a machine tool such as a lathe.

It is an object of the invention to provide such a tool holder of the ejector type in which the insert is adjustable and removable, while being strongly supported by the body of the holder against the principal working stresses.

A further object is to provide such a holder which can support an insert worn and dressed to a small fraction of its original size just as rigidly as a new or slightly worn insert.

Another object is to provide a holder in which all adjustments of the insert therein can be effected from the top and bottom of the holder.

A further object is to provide certain improvements in the form, construction and arrangement of the several parts whereby the above named and other objects may effectively be attained.

A practical embodiment of the invention is shown in the accompanying drawings, in which Fig. 1 represents a top plan view of the holder assembled with an insert of square cross-section;

Fig. 2 represents a side elevation of the holder shown in Fig. 1;

Fig. 3 represents a front end elevation of the holder shown in Fig. 1;

Fig. 4 represents a detail section, on an enlarged scale taken on the line IV—IV of Fig. 1, parts being broken away;

Fig. 4a represents a section, similar to Fig. 4, showing a detail modification;

Figs. 5, 6 and 7 represent, respectively, top, end and side views of the yoke piece shown in Figs. 1 to 3;

Fig. 8 represents a top plan view of a modified form of holder, arranged to support an insert of cylindrical form;

Fig. 9 represents a top plan view of another modified form of holder, arranged to support an insert of triangular cross-section, and Fig. 10 represents a top plan view of a third modified form of holder, arranged to support an insert of rectangular cross-section.

Referring to the drawings, the holder is shown as comprising a shank 1, by means of which the holder is mounted in a metal working machine, and a head 2, integral with the shank and formed from a suitable tough grade of steel. The shank is rectangular in vertical cross-section and the head, where it projects below the shank, is approximately rectangular in horizontal cross-section but has its front face 3 at a slight angle (as shown in Fig. 1) from the plane normal to the axis of the shank. A recess 4 is formed in the head from the front face 3 thereof, said recess being bounded by a flat back wall 5 lying at an angle of approximately 7° to the vertical, an inner side wall 6 lying at an angle of approximately 7° to the vertical and forming a right angle with the wall 5 at their line of intersection, and an outer side wall 7 lying parallel to the wall 6 and also forming a right angle with the wall 5 at the line of intersection with said wall. A hole 8 is drilled and tapped through the bottom of the head on an axis parallel to the lines of intersection of the walls 5, 6 and 7, to receive a set screw 9; and the bottom face 10 of the head is beveled to lie in a plane perpendicular to said axis so that it forms a level seat for the lock nut 11 on the screw 9. The 7° inclination of the walls of the recess is mentioned as a typical dimension which may be varied approximately in the range from 4° to 9°; if less than 4° it is difficult to provide clearance between the tool holder and the work, and if more than about 9° an undue breaking strain is put on the insert.

The top surfaces 12, 13, 14 of the head may desirably be stepped down slightly below the level of the top of the shank, and the upper part of the wall 7 is cut away (as most clearly shown in Fig. 2) for reasons which will become apparent. The separation of the coplanar surfaces 12, 13, 14 results from the provision of slide-way 15 in the top of the head and extending, conveniently, into the adjoining part of the shank; said slide-way having a flat bottom surface and being bifurcated to form branches 15' and 15'' which are bounded laterally by parallel vertical walls intersecting the surfaces 12, 13, 14. The branches 15' and 15'' open into the upper part of the recess 4 through the walls 6 and 5 respectively, and the material of the head is removed to deepen the ends of said branches at 16 and 16' to about twice the depth of the rest of the slide-way. If desired, the part of the head between the branches 15', 15'' may project up to the level of the top of the shank, as shown at 13'' in Fig. 4a.

The slide-way just described is designed to contain and guide a U-shaped yoke piece 17 (shown separately in Figs. 5, 6 and 7) machined or, preferably, cast from a hard tool steel or a suitable cast alloy such as "Stellite," "Tantung," "Rexalloy," etc., having a Rockwell hardness in the vicinity of 60. The ends of the yoke piece have inclined surfaces 18, 18' lying in planes parallel, respectively, to the walls 6 and 5, and are provided with inwardly turned gripping fingers 19, 19' the inner faces of which lie in planes parallel, respectively, to the surfaces 18' and 18 while forming right angles at their lines of intersection with the adjacent surfaces 18 and 18', respectively. The ends of the yoke piece and the fingers 19, 19' are preferably reinforced by being extended downwardly to about double the vertical thickness of the rest of the yoke piece, as clearly appears in Figs. 2, 3, 6 and 7, the thickened ends of said piece being accommodated in the deepened ends 16, 16' of the slide-way branches; a certain looseness being provided in the direction of the length of the branches 15', 15", so that the yoke piece can move at least a small fraction of an inch in that direction. A vertical semi-cylindrical bearing surface 20 is formed inside the middle of the yoke piece.

A hole 21 is drilled and tapped into the top of the head on an axis parallel to the line of intersection of the walls 5 and 6 and in the plane bisecting the angle formed by said walls. The part 13' of the head adjacent this hole 21 and corresponding to the surface 13 is provided with a semi-cylindrical seat 22 formed parallel to the axis of the hole. A locking screw 23 fits in the hole 21 and has a head comprising a lower conical part 23' and an upper cylindrical part 23", the taper of the part 23' being such that it will bear with at least a vertical line contact against the bearing surface 20 on the yoke piece and the diameter of the part 23" being such that it will have an easy friction fit with the seat 22.

In operation, the screw 23 is loosened, the yoke piece 17 is moved slightly forward, an insert A of square cross-section is slid down into the recess 4 with opposite corners of the insert fitting snugly in the angles formed by the surfaces 18, 18' and the adjoining inner faces of the fingers 19, 19'. The screw 9 is adjusted so as to support the insert at the proper height and is locked in place by means of the nut 11. The screw 23 is then screwed down, generally to or past the position shown in Fig. 4, and as it descends the tapered part 23' bearing against the surface 20 forces the yoke piece back; the fingers 19, 19' on the ends of the yoke piece pull the insert firmly against the walls 5, 6 of the recess 4 and hold the insert during its use in any usual manner.

When it is desired to turn the insert to present a fresh working edge or "radius" the screw 23 is loosened and the insert pulled out, turned, replaced and clamped again in its working position; or a new insert is inserted and clamped in the same manner.

It will be observed that these adjusting and replacing operations are effected entirely from the top and bottom of the holder, so that two or more holders may be mounted side by side in a machine as closely as desired and need not be removed no matter how many times the inserts have to be changed. The stepped-down top surface of the head may be about 1/8" below the top of the shank and the insert projects upward sufficiently to bring its working edge or radius to the level of the top of the shank, which level corresponds to the center of the work on most machines. The chip thus originates well above the nearest parts of the holder so that damage to the latter by "chip wash" is minimized. The hard cutting insert itself protects all parts of the holder from chip damage, and the yoke piece is open in front of the insert in order to remove as much material as possible from this danger zone. The yoke piece projects over and, being relatively durable, protects the top of the wall 7 where the latter is cut away as mentioned above.

A most important consideration is the fact that the insert rests firmly against the walls 5, 6 of the recess 4 and is thus supported directly by the body of the holder itself in the direction of the greatest stresses, this support extending all the way up to the level of the surface 13; the part 13' being further braced and supported by the cylindrical part 23" of the screw 23 bearing against the seat 22. Additional backing and support for the insert results from the use of the higher part 13" (Fig. 4a), which part can also serve to support a chip breaker (not shown) of any suitable type adapted to be screwed to the top of said part and to overlie the rear portion of the insert. Even when the insert has been worn and dressed down to less than one-third its original length it can still be held by the fingers 19, 19' and can still work accurately and effectively. Thus an insert which may originally be 1 1/4" to 1 1/2" in length can be used even when worn down to about 3/8" instead of being discarded when its length reaches about 3/4", as at present. Any tendency for the ends of the yoke piece to spread apart is overcome by the outer walls of the branches 15', 15" of the slide-way between which the yoke piece slides.

While the foregoing description refers primarily to a holder for square inserts, it is evident that only simple adaptations of the structure are required in order to accommodate inserts of other customary shapes. Thus, in Fig. 8 is shown a modified form of yoke piece 24 designed to grip a cylindrical insert B and hold it against the walls of a recess of corresponding shape. Fig. 9 shows a yoke piece 25 gripping a triangular insert C and holding it against a flat recess wall. And Fig. 10 shows a yoke piece 26 designed to grip opposite corners of an insert D of rectangular cross-section and hold it against walls disposed substantially as in the case of the square insert. The yoke pieces 17, 24 and, if desired, 25 are symmetrical so that they can be used interchangeably in right or left hand holders.

It will be understood that various changes may be made in the details of the structure shown and described without departing from the spirit and scope of the invention.

What I claim is:

1. A tool holder of the character described for holding a working insert of elongated form and uniform cross-section comprising, a head recessed to accommodate said insert, the inner walls of the recess being shaped to fit the sides of said insert and extending to the top of the head on the side of the insert opposite that from which major working stresses are directed, a movable yoke piece having its ends shaped to embrace the sides of the insert at two substantially opposite points adjacent its working end and means for moving said yoke piece in a direction to hold said insert against said inner walls, said yoke moving means being a screw movable into and out of the top of the tool holder head and provided with a tapered part adapted to bear against and move the yoke piece.

2. A tool holder according to claim 1 in which said screw is provided also with a cylindrical part adapted to bear against a part of the head.

3. A tool holder of the character described for holding a working insert of elongated form and uniform cross-section comprising a normally horizontal shank, a head recessed to accommodate said insert, the inner walls of the recess being shaped to fit the sides of said insert, extending to the top of the head on the side of the insert opposite that from which major working stresses are directed and lying at inclinations from the vertical which fall approximately within the range from 4° to 9°, a yoke piece adapted for engaging the sides of the insert at two substantially opposite points adjacent its working end, and means for moving said yoke piece in a direction to hold said insert against said inner walls, the top of the head being stepped down below the level of the top of the shank and provided with a bifurcated slide-way in which the yoke piece is adapted to move.

4. A tool holder according to claim 3 in which the part of the head between the bifurcations of the slide-way is bounded on one side by the inner walls of the recess and on the opposite side by a cylindrical surface, and in which the yoke moving means is a screw movable into and out of the top of the head on the axis of said cylindrical surface, said screw being provided with a cylindrical part adapted to bear against said cylindrical surface and with a tapered part adapted to bear against and move the yoke piece.

5. A tool holder of the character described for holding a working insert of elongated form and uniform cross-section comprising, a normally horizontal shank, a head recessed on its front face to accommodate said insert, the inner walls of the recess being shaped to fit the sides of the insert and extending at inclinations from the vertical which fall approximately within the range from 4° to 9° from a point within the head to the top of said head, vertical insert adjusting means in the bottom of the recess, the top of the head being provided with a bifurcated slide-way the branches of which communicate with the top of the recess at laterally spaced points, a yoke piece movable in said slide-way and having its ends adjacent the recess shaped to embrace the sides of the insert at two substantially opposite points, and means in the top of the head for moving the yoke piece in a direction away from the recess, whereby an insert embraced by the ends of said piece may be held rigidly and releasably against the inner walls of the recess.

6. A tool holder according to claim 5 in which the top of the head is stepped down below the level of the top of the shank.

7. A tool holder according to claim 6 in which the ends of the yoke piece are adapted to embrace the sides of the insert at points adjacent to and immediately below the level of the top of the head.

PAUL DOERSELN.

References Cited in the file of this patent

UNITED STATES PATENTS

| Number | Name | Date |
|---|---|---|
| 1,011,714 | Baker | Dec. 12, 1911 |

FOREIGN PATENTS

| Number | Country | Date |
|---|---|---|
| 617 | Austria | Nov. 5, 1899 |
| 12,781 | Great Britain | Mar. 16, 1911 |
| 174,575 | Great Britain | May 11, 1922 |